United States Patent Office 2,769,826
Patented Nov. 6, 1956

2,769,826

ISOCYANATE-CASTOR OIL METAL CEMENT

Clayton W. Yoho, Pittsburgh, Pa., assignor to Stoner-Mudge, Inc., Pittsburgh, Pa., a corporation of Pennsylvania No Drawing. Application September 28, 1953,
Serial No. 382,873

4 Claims. (Cl. 260—407)

This invention relates to cementing metal pieces together, and more particularly to cementing the side seams of metal cans together instead of soldering them in the conventional manner.

The customary practice of soldering the side seams of food cans and the like with metal solders is objectionable in some cases. For example, solder will not adhere to organic coatings, and the soldering temperatures tend to injure adjacent organic coatings applied before the soldering operation. In accordance with my invention, an adhesive is substituted for the solder while still retaining substantial strength at the joints. The cement cures at temperatures from 70–400° F., is flexible, strong and alkali- and solvent-resistant, and can withstand processing and pasteurization during usual food and beverage packing operations. The cement adheres to bare metal surfaces and also to organic coatings, and permits the can body blanks to be entirely coated with primers and other organic coatings without troubling to preserve the conventional uncoated margin for soldering purposes.

The practice of cementing the side seams of cans with solvent-dispersed organic cements or with organic cements which evolve a volatile by-product during the curing reaction is not desirable. The reactants of my invention do not require solvents or produce any volatile by-products during the curing reaction.

The invention makes use of the reaction of an isocyanate group with an active hydrogen atom:

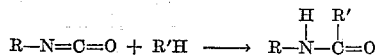

where R and R' are any organic radicals. The reactants of the invention are polyfunctional and hence a polymeric material results. Furthermore, one of the two reactants is trifunctional and hence a highly crossed-linked, thermally stable, polymeric cement is obtained. Methylene bis-(4-phenyl isocyanate), hereinafter called MDI, is used as the difunctional isocyanate; and castor oil is used as the trifunctional active hydrogen compound. When these components are mixed, an irreversible reaction occurs, which results in the formation of a gel if the materials are used in proportions near stoichiometric amounts. In order to obtain the desired results, it is not feasible merely to mix these components, because the viscosity is too low, when they are mixed initially, for the cement to stay in the joint of a can while the joint is cemented together. Furthermore, the viscosity becomes too great if the components are left together for too long a time. It is not practical to wait until the mixture reaches exactly the right condition and then immediately cement the can joint. I overcome this obstacle by preparing at least one prepolymer which contains an unbalanced portion of the ingredients required for the cement and can be stored indefinitely while maintaining a constant desired viscosity. When the cement is needed, I add the balance of the required ingredients to the prepolymer and obtain a cement having a usable initial viscosity controlled by the viscosity of the prepolymer. The preparation of typical prepolymers and of the final cements is illustrated by the following examples:

*Prepolymer A.*—1000 g. of castor oil were heated to 130–140° C., in a flask; and 76.4 g. of MDI were added in a dropwise manner, at such a rate that the temperature of the reaction mixture did not rise above 150° C. The time required to complete the reaction was about 30 to 45 minutes, with agitation. The resulting product, called an "excess castor oil prepolymer," had an MDI/castor-oil ratio of 5.5/72 and a viscosity of approximately 5000 centipoises, at 80° F.

Other prepolymers of the excess-castor-oil type can be made. By controlling the MDI/castor-oil ratio, the viscosity of the prepolymer can be varied as desired. The greater the ratio of MDI to castor oil, the greater will be the viscosity, as shown in the following table:

| MDI/Castor-Oil Ratio | Viscosity, at 80° F. (cp.) |
|---|---|
| 5.5/72 | 5,000 |
| 6.5/72 | 7,000 |
| 7.5/72 | 10,500 |
| 8/72 | 17,000 |
| 8.5/72 | 20,000 |
| 10/72 | 50,000 |
| 11/72 | 100,000 |

Excess caster oil prepolymers having MDI/castor-oil ratios higher (more MDI) than 11/72, or lower (less MDI) than 5.5/72, can be prepared; but their viscosities are so high in the first case (over 100,000 cp.), and so low in the second (under 5,000 cp.) that cements made from such prepolymers are not practical to use by conventional application techniques.

*Prepolymer B.*—140 g. of MDI were heated to 90° C., in a resin flask; and 100 g. of castor oil preheated to 90° C. were added at one time. The mixture was stirred rapidly and the reaction required about 10 minutes. The resulting product, called an "excess MDI prepolymer," had an MDI/castor-oil ratio of 28/20 and a viscosity of approximately 20,000 centipoises, at 80° F. Other prepolymers prepared in essentially the same manner with the same ratio but different temperatures or rates of stirring, had viscosities of 10,000–50,000 centipoises.

Other prepolymers of the excess-MDI type can be made. In general, with these prepolymers, the viscosity will be more dependent upon the reaction conditions than upon the MDI/castor oil ratio. I have found that, in general, ratios lower (less MDI) than 1/1 yield prepolymers which have viscosities too high (above 100,000 cp.) for general use in the formulation of cements, and ratios higher (more MDI) than 28/10 yield prepolymers having viscosities too low (below 5000 cp.) for that purpose.

Both types of prepolymer can be stored indefinitely in closed containers (with all air excluded, in the case of excess MDI prepolymers), without changing viscosity appreciably.

The optimum weight ratio of MDI to castor oil, in the final cement, is 28/72, which is approximately the stoichiometric ratio. The viscosity is governed by the viscosity of the prepolymer when the complete cement is first made, and thereafter the cement cures progressively and becomes a soft gel in about two hours at room temperature. Typical cements are described in the following examples:

*Cement—Example I.*—77.5 parts of prepolymer A were mixed with 22.5 parts of MDI, to yield a cement which had an initial viscosity of 3,000 cp., at 80° F. This material was applied to 1-inch strips of unprimed and primed metal; and two similar strips were sealed together in each instance, at 400° F. for 30 seconds, using 100 lb./sq. in. pressure. The strips were then pulled apart, in a peeling manner, with a Scott tensile tester, at a pull rate of 2 in./min. The adhesion values are shown below:

| Substrate | Adhesion (lb./in.) |
|---|---|
| Unprimed steel | 15 |
| Unprimed tinplate | 16 |
| Steel primed with oleoresinous lacquer | 02 |
| Steel primed with heat-curable phenolic lacquer | 22 |

The curing time, temperature, and pressure were varied systematically. The curing time is dependent on the curing temperature. However, a 24-hour cure at 80° F. will yield as strong a cement as a 5-second cure at 600° F. Pressure does not influence cure, except with regard to rate of heat transfer through the metal to the cement, and with regard to conforming the cement to the exact contour of the metal surface. An organic coating on the cemented metal surfaces generally improves adhesion, to a degree varying with the particular coating used.

Unprimed strips cemented with solder in a similar manner had adhesion values in the range of 30–40 lb./in. Solder would have substantially no adherence if applied to a metal surface previously primed with an organic coating.

*Cement—Example II.*—60 parts of prepolymer A were mixed with 40 parts of prepolymer B, to yield a cement which had an initial viscosity of 15,000 cp., at 80° F. The adhesion values were found to be substantially the same as those of Example I.

*Cement—Example III.*—48 parts of prepolymer B were mixed with 52 parts of castor oil, to yield a cement which had an initial viscosity of 10,000 centipoises, at 80° F. The adhesion values were found to be substantially the same as those of Example I.

*Cement—Example IV.*—34 parts of prepolymer B were mixed with 66 parts of a prepolymer having an MDI/castor-oil ratio of 10/72, to yield a cement having an initial viscosity of 40,000 cp., at 80° F. The adhesion values were found to be substantially the same as those of Example I.

*Cement—Example V.*—Addition of pigments to the cements is permissible if the pigment is inert with respect to the organic ingredients. Aluminum pigments and other inert fillers, such as silica, talc, etc. can be used. For example, a cement of the same properties as mentioned above can be obtained by mixing 77.5 parts of prepolymer A with 1.5 parts aluminum pigment and 22.5 parts of MDI. The aluminum-pigmented cement has an initial viscosity of 4,000 cp., at 80° F.

While I have described certain present preferred embodiments and methods of practicing the invention, it will be recognized that the invention is not limited thereto but may be otherwise variously embodied and practiced within the scope of the following claims.

I claim:

1. A process of preparing a polymeric cement of suitable viscosity, comprising the steps of preparing a first prepolymer in which the reactants consist of 5.5 to 11 parts of methylene bis-(4-phenyl isocyanate) and 72 parts of castor oil, and a second prepolymer in which the reactants consist of 10 to 28 parts of methylene bis-(4-phenyl isocyanate) and 10 parts of castor oil, said prepolymers each having a stable viscosity in the range of 5000 to 100,000 centipoises at 80° F., and subsequently mixing the said prepolymers in such proportions that the total mixture has a methylene bis-(4-phenyl isocyanate) and castor oil content in substantially stoichiometric proportions.

2. A process of preparing a polymeric cement of suitable viscosity, comprising the steps of preparing a first prepolymer in which the reactants consist of 5.5 parts of methylene bis-(4-phenyl isocyanate) and 72 parts of castor oil, and a second prepolymer in which the reactants consist of 28 parts of methylene bis-(4-phenyl isocyanate) and 20 parts of castor oil, and subsequently mixing 60 parts of the first prepolymer with 40 parts of the second prepolymer.

3. A process of preparing a polymeric cement of suitable viscosity, comprising the steps of preparing a prepolymer in which the reactants consist of 5.5 to 11 parts of methylene bis-(4-phenyl isocyanate) and 72 parts of castor oil, said prepolymer having a stable viscosity in the range of 5000 to 100,000 centipoises at 80° F., and subsequently mixing said prepolymer with additional methylene bis-(4-phenyl isocyanate) in such proportions that the total mixture has a methylene bis-(4-phenyl isocyanate) and castor oil content in substantially stoichiometric proportions.

4. A process of preparing a polymeric cement of suitable viscosity, comprising the steps of preparing a prepolymer in which the reactants consist of 10 to 28 parts of methylane bis-(4-phenyl isocyanate) and 10 parts of castor oil, said prepolymer having a stable viscosity in the range of 5000 to 100,000 centipoises at 80° F., and subsequently mixing said prepolymer with additional castor oil in such proportions that the total mixture has a methylene bis-(4-phenyl isocyanate) and castor oil content in substantially stoichiometric proportions.

References Cited in the file of this patent

UNITED STATES PATENTS

| | | |
|---|---|---|
| 2,326,966 | O'Leary | Aug. 17, 1943 |
| 2,358,475 | Pratt et al. | Sept. 19, 1944 |
| 2,609,349 | Cass | Sept. 2, 1952 |

OTHER REFERENCES

"Paint, Oil & Chemical Review," pages 28–30, Dec. 17, 1953.